(12) United States Patent
Fujita et al.

(10) Patent No.: US 9,229,151 B2
(45) Date of Patent: Jan. 5, 2016

(54) LIGHT GUIDE (71) Applicant: Panasonic Intellectual Property Management Co., Ltd., Osaka (JP)

(72) Inventors: Masaru Fujita, Osaka (JP); Shohroh Mochida, Osaka (JP); Yoshihiko Kanayama, Hyogo (JP); Yusuke Kusaka, Osaka (JP); Masami Ito, Osaka (JP); Takanori Kikuchi, Nagano (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/394,487

(22) PCT Filed: Apr. 26, 2013

(86) PCT No.: PCT/JP2013/002837
§ 371 (c)(1),
(2) Date: Oct. 15, 2014

(87) PCT Pub. No.: WO2013/168392
PCT Pub. Date: Nov. 14, 2013

(65) Prior Publication Data
US 2015/0085530 A1    Mar. 26, 2015

(30) Foreign Application Priority Data

May 10, 2012    (JP) ................... 2012-108263

(51) Int. Cl.
*F21V 7/04* (2006.01)
*F21V 8/00* (2006.01)

(52) U.S. Cl.
CPC ............ *G02B 6/0053* (2013.01); *G02B 6/0045* (2013.01); *G02B 6/0055* (2013.01); *G02B 6/0061* (2013.01); *G02B 6/002* (2013.01); *G02B 6/0038* (2013.01)

(58) Field of Classification Search
CPC ....................................... G02B 6/0033–6/0048
USPC .................................................. 362/623–626
See application file for complete search history.

(56) References Cited

U.S. PATENT DOCUMENTS

2002/0036729 A1    3/2002  Ohkawa
2004/0085748 A1*   5/2004  Sugiura .......................... 362/31

(Continued)

FOREIGN PATENT DOCUMENTS

JP    2004-200128    7/2004
JP    2005-011599    1/2005

(Continued)

OTHER PUBLICATIONS

International Search Report of PCT application No. PCT/JP2013/002837 dated Aug. 6, 2013.

(Continued)

*Primary Examiner* — Sean Gramling
(74) *Attorney, Agent, or Firm* — Wenderoth, Lind & Ponack, L.L.P.

(57)    ABSTRACT

Provided a light guide (11) including side surfaces on which light is incident, a reflection prism surface having plural prisms (12) on which light is reflected, and a light emitting surface from which the light is emitted, in which the reflection prism surface includes a first region (PA) in which a pitch of the prisms (12) varies and a second region (TA) in which a depth of the prisms (12) varies. In the light guide (11), the first region is arranged in the side surface on which the light is incident, and a second region (TA) is arranged adjacent to the first region and in an inward side of the light guide (11).

12 Claims, 6 Drawing Sheets

(56) References Cited

U.S. PATENT DOCUMENTS

| | | |
|---|---|---|
| 2006/0044832 A1 | 3/2006 | Feng et al. |
| 2006/0050531 A1 | 3/2006 | Tsuda |
| 2007/0217227 A1 | 9/2007 | Watanabe et al. |
| 2008/0130317 A1 | 6/2008 | Shimura et al. |
| 2010/0266786 A1 | 10/2010 | Shimura et al. |

FOREIGN PATENT DOCUMENTS

| | | |
|---|---|---|
| JP | 2005-123049 | 5/2005 |
| JP | 2007-225788 | 9/2007 |
| JP | 2008-52940 | 3/2008 |
| JP | 2008-052940 | 3/2008 |
| JP | 2009-070643 | 4/2009 |
| JP | 2012-059612 | 3/2012 |

OTHER PUBLICATIONS

Extended European Search Report issued May 22, 2015 in corresponding European Application No. 13788140.5.

* cited by examiner

LIGHT GUIDE

CROSS-REFERENCE TO RELATED APPLICATIONS

The present application is a U.S. national stage application of PCT International Application No. PCT/JP2013/002837 filed on Apr. 26, 2013, and claims the benefit of foreign priority to Japanese patent application 2012-108263 filed on May 10, 2012, the contents all of which are incorporated by reference.

TECHNICAL FIELD

The present invention relates to a light guide used for an illumination device.

BACKGROUND ART

Figure 12:
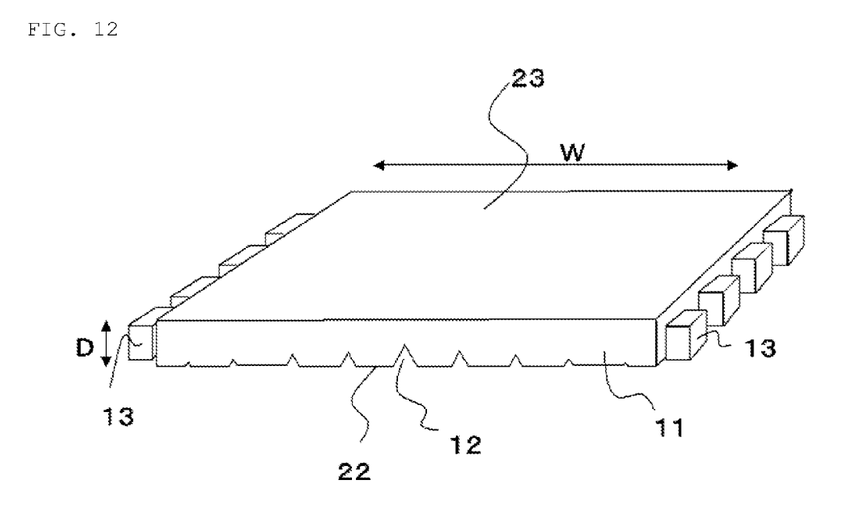
FIG. 12 is a perspective view of a related-art light guide.

A light guide in the related art disclosed in Patent Document 1 will be explained with reference to FIG. 12. The light guide has a rectangular parallelepiped shape. FIG. 12 is a perspective view of a related-art light guide. The related-art light guide includes LED light sources 13 and a light guide 11 as shown in FIG. 12.

The light guide 11 includes a reflecting prism surface 22 having plural prisms 12 and a light emitting surface 23 opposite thereto. The light guide 11 allows incident light to propagate therein, allowing the light to be reflected by the prisms 12 and emitting the light from the optical light emitting surface 23. LED light sources 13 are arranged on both end portions of the light guide 11.

The LED light sources 13 are light generating means generating light emitted to the light guide 11. The depth of the prisms 12 becomes deeper as getting away from the LED light sources 13. The prisms 12 are formed in this manner so that light generated directly from the LED light sources 13 and reflected light reflected on the light emitting surface 23 can be uniformly reflected as the entire light guide 11 regardless of positions. That is, the light is difficult to reach inside as the light propagates inside, therefore, large prisms are used for reflecting light more efficiently.

FIG. 12 is schematically expressed and shows the small number of prisms 12. This is the same in the following drawings. In this case, for example, the reflecting prism surface 22 actually has 169 triangular prisms 12 in the light guide 11. These prisms 12 are numbered in a manner that N=1, 2, ..., 84, 85, 84, 83, ..., 2, 1 from an end portion of the light guide 11 to the center.

A length W of the light guide 11 is 59.2 mm and a thickness D of the light guide 11 is 3.5 mm. A pitch between the prisms 12 is fixed at 0.35 mm. As the depth of the prisms 12 (the height of triangles), a depth in the first prism 12 at the endmost position is 24.3 µm, and a depth of the 85th prism 12 in the center is 75 µm.

In the related-art light guide 11, the depth of the prisms 12 is changed to thereby allow the guided light to be reflected to the light emitting surface 23 side. Though the thickness D of the light guide 11 is 3.5 mm, a portion through which light is transmitted to the center is necessary, therefore, the maximum depth of the prisms 12 is 75 µm (a thickness of several %).

In the above structure, it is necessary to make the heights of the prisms 12 further deeper for designing a light guide 11 having a further larger area. However, it is difficult to reduce the thickness of the light guide 11 with respect to the heights of the prisms 12 to be less than a certain ratio, and the possible thickness is limited by the heights of the prisms 12. Accordingly, when a thin-film light guide 11 with 0.2 to 0.3 mm is to be designed, it is difficult to secure a thickness enough to guide necessary light.

CITATION LIST

Patent Literature

PTL 1: JP-A-2004-200128

SUMMARY OF INVENTION

In order to solve the above problems, there is provided a light guide including side surfaces on which light is incident, a bottom surface having plural grooves on which the light is reflected, and an upper surface from which the light is emitted, in which the bottom surface includes a first region in which a pitch of the grooves varies and a second region in which a depth of the grooves varies.

According to the present invention, as the region in which the pitch of approximately V-shaped prisms varies and the region in which the height of the prisms varies are included, the depth of the V-shaped prisms in accordance with the sheet thickness of the light guide can be set so that the depth of the V-shaped prisms does not become too deep.

On the other hand, when the pattern of the region with a large area (large light guide 11), for example, exceeding 1 m is to be designed only by varying the pitch, a pitch width of prisms exceeding 800 µm will be necessary. In this case, unevenness between pitches is recognized by human eyes, therefore, it is difficult to obtain a uniform light emitting surface.

In the optical system of the light guide according to the present invention, the thickness for guiding light can be secured also in a portion in which the depth of the approximately V-shaped prisms is maximum even in the thin-sheet light guide having the large area, therefore, the light guide which can realize the uniform light emitting surface in a range of pitches which is not recognized as unevenness by human eyes can be obtained.

DESCRIPTION OF EMBODIMENTS

Hereinafter, embodiments of the present invention will be explained with reference to the drawings.

Embodiment 1

Figure 1A:
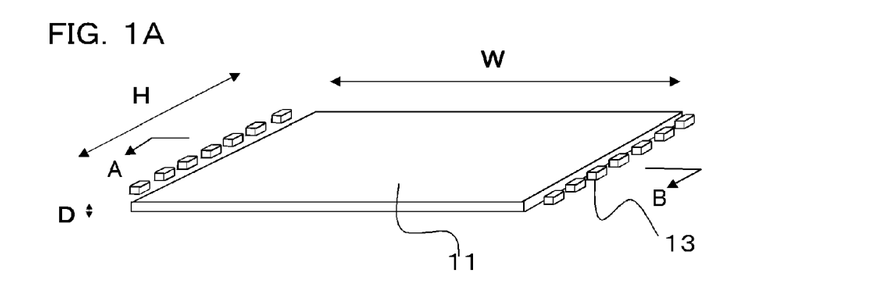
FIG. 1A is a perspective view showing a light guide according to Embodiment 1.

A light guide 11 according to Embodiment 1 will be explained with reference to FIG. 1A and FIG. 1B. FIG. 1A is a perspective view showing an illumination optical system in an illumination device using the light guide 11 according to Embodiment 1 of the present invention. The illumination optical system shown in FIG. 1A includes LED light sources 13 and the light guide 11. A plurality of LED light sources 13 are linearly arranged on opposite two surfaces of the light guide 11 respectively at almost constant intervals.

Figure 1B:
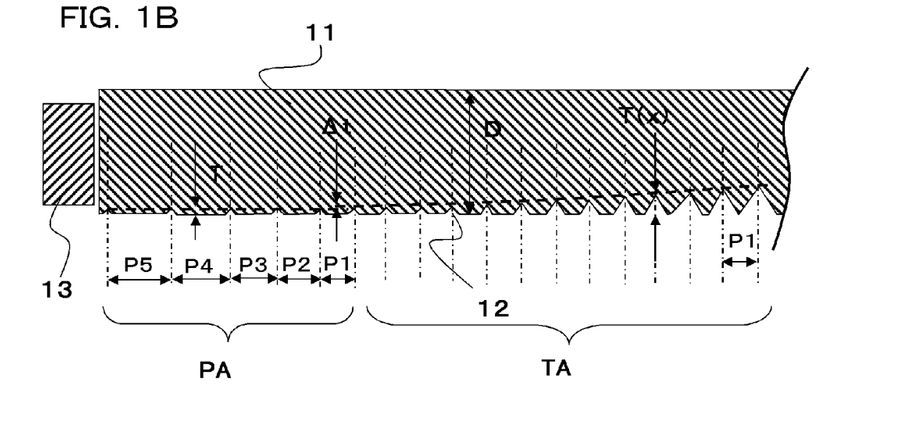
FIG. 1B is a partial cross-sectional view of an end portion of the light guide according to Embodiment 1.

FIG. 1B is an enlarged view of a cross section of an end portion in a portion A-B of the light guide 11 shown in FIG. 1A. Prisms 12 as plural grooves are formed. A depth T of the prism represents a depth of the prism 12. A thickness D represents a portion of the light guide 11 where the prism 12 is not formed.

A first region PA is a region where the depth T of the prisms 12 is fixed and a pitch P of the prisms 12 is variable. A second region TA is a region where a pitch P is fixed and the depth T of the prisms 12 is variable. The first region PA in which the pitch is variable and the second region TA in which the depth is variable are arranged side by side in this order from the LED light source 13 side. It is also preferable that a region where any prism 12 does not exist is provided between a side end portion of the light guide 11 in the LED light source 13 side and the first region PA in which the pitch is variable.

A variation Δt represents a variation of the depth of the prisms 12 between the first region PA and the second region TA. The variation represents that the pitch varies in a pitch P5 to a pitch P1. A depth T (x) represents that the depth of the prisms 12 varies in accordance with a distance "x".

The light guide 11 is formed by one layer of an acrylic resin layer. In the light guide 11, the prisms 12 with an approximately V-shape are extended in the same direction as the linear alignment of the LED light sources 13. The prisms 12 which are V-shaped grooves formed by one layer of an acrylic sheet layer are directly formed on the acrylic resin layer by a thermal transfer process and so on.

A length W of the light guide 11 is 470 mm, a width H is 270 mm and a thickness D is 0.3 mm. The minimum depth of depths T of the prisms 12 in the light source side of the LED light sources 13 is 0.7 μm, which is a very small height. The prisms 12 are formed so that the maximum value of the pitches P is 800 μm.

In the case of FIG. 1B, the pitch P5 is the maximum pitch. In the light guide 11 in the present invention, all pitches P are 800 μm or less. This is for preventing unevenness visually recognized. When the pitch P is close to 1 mm, a pattern is visually recognized. The problem of unevenness does not occur when the pitch P is at least 800 μm or less.

In the first region PA, a level of several pitches is shown from the pitch P5 to the Pitch P1 in FIG. 1B, however, the pitch P is actually varied as variable pitches P to approximately 200 pitches. The pitch P is reduced as getting away from the LED light sources 13 so that the area in which light is reflected toward the emission surface direction (upper surface) is increased. This is for allowing a small amount of light in distant places to be reflected to the emission surface direction as the light intensity is reduced as getting away from the LED light sources 13.

The minimum pitch P1 in the embodiment is 130 μm. In this case, it is possible to further reduce the minimum pitch P, however, the number of prisms 12 as the reflection surface is increased and a long period of time is taken for forming the pattern at the time of fabrication, which is not efficient in an economical aspect. Additionally, when the area is increased, it is difficult to set the minimum pitch P to be smaller than the width of the prisms 12, therefore, the pitch P is finite and has a limit in size.

Also in the first region PA in which the pitch is variable, the depth of the prisms 12 is fixed. This is for securing light to be guided to the second region TA in which the depth is variable positioned next.

Here, the pitch P is fixed at a position where the minimum pitch P1 is 130 μm in the first region PA in which the pitch is variable, and the depth T of the prisms 12 is changed to be deeper. That is, the second region TA in which the depth is variable is formed. In the embodiment, the maximum depth T is 6 μm.

Figure 2A:
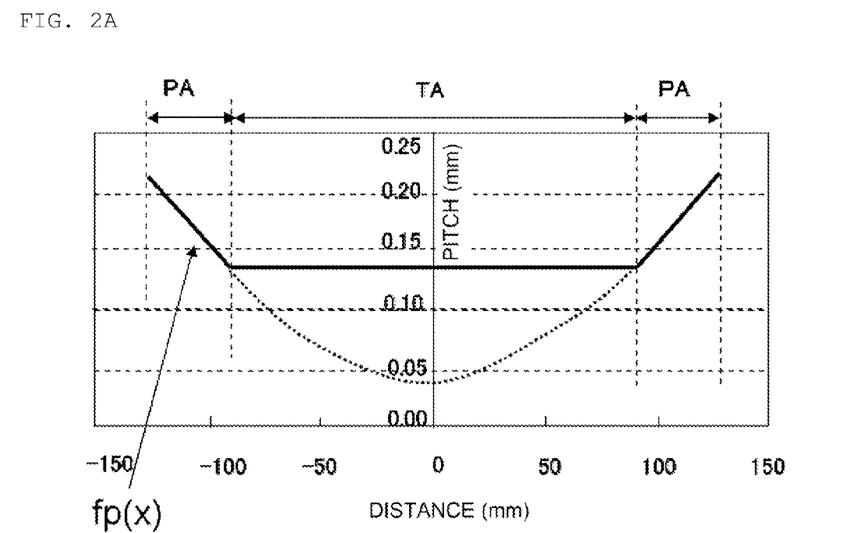
FIG. 2A is a view showing a pitch distribution of grooves in the light guide according to Embodiment 1.
Figure 2B:
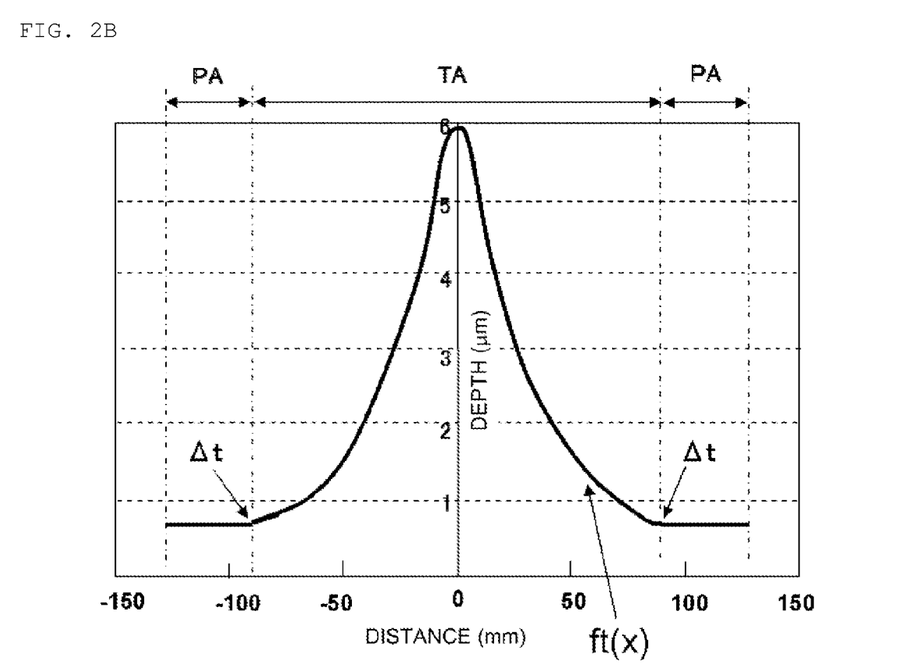
FIG. 2B is a view showing a depth distribution of the light guide according to Embodiment 1.

FIG. 2A shows variations of the pitch of the prisms 12 in the length W direction in the light guide 11. FIG. 2B shows variations of the depth of the prisms 12 in the length W direction in the light guide 11. Both variations are shown in the vicinity of the center of the light guide 11. The horizontal axis represents the distance "x" in the length direction (W direction) of the light guide 11, and the center of the light guide 11 is 0 mm. The first regions PA are positioned on both ends of the light guide 11, namely, on the LED light source 13 sides, and the second region TA is positioned therebetween.

As shown in FIG. 2A, the first region PA in which the pitch is variable is defined by a curve function fp (x) in which the pitch P (x) smoothly varies in the distance "x" from the LED light source 13 side. The function is a linear function or a function close to the linear function, which monotonously increases and decreases.

As shown in FIG. 2B, the second region TA in which the depth is variable is a curve function ft (x) in which the depth T (x) smoothly varies in the distance "x" from the light source. The function is a parabolic function or a hyperbolic function in which the maximum value is taken in the center of the light guide 11 to be decreased to end portions.

Additionally, in the light guide 11, contrast difference of luminance occurs due to a sudden change of the depth T. Accordingly, the contrast difference is likely to occur at a place where the depth of the prisms 12 is changed between the first region PA and the second region TA. A variation Δt of the depth of the prisms 12 at a boundary of respective regions should be a variation of 0.6 μm or less.

As a result of checking luminance unevenness by changing the variation Δt, unevenness was recognized by depth difference of 0.6 μm or more. Accordingly, it is necessary to set the depth to 0.6 μm or less.

The unevenness in this case indicates bright lines appearing between the first region PA and the second region TA. At the time of visual check, discontinuity is likely to be detected especially at a position where continuity is broken. Therefore, it is necessary to limit the variation Δt as described above.

In the embodiment, the maximum depth of grooves in the second region TA in which the depth is variable is 6 μm. As the light guide 11 is a thin sheet with the thickness D of 0.3 mm, the strength is drastically reduced when the depth of the prism 12 is deep. Additionally, a light guiding range for guiding light to a distant position is necessary in an optical sense, and it is desirable that the prism 12 is not formed to at least 95% of the depth D of the light guide 11.

In the embodiment, the maximum depth of the prisms 12 is 6 μm, which is 2% with respect to 0.3 mm as the thickness D of the light guide 11. In the case where a releasing force is unbalanced in a releasing process after being transferred to the thin sheet in the transfer method such as hot pressing in the fabrication process, deformation occurs. A relation between the thickness D of the light guide 11 and the maximum depth Tmax of the depth T of the prisms 12 is desirably expressed by the following expression 1 in order to bring three factors which are an optical factor, a strength factor and a factor on the fabrication process to a range in which the fabrication is realized.

$$Tmax/D \leq 0.05 \qquad \text{(Expression 1)}$$

Here, when the thickness of the light guide 11 is not fixed, it is necessary to satisfy the relation of the expression (1) in the thinnest part in the light guide 11 where light is guided.

Figure 1C:
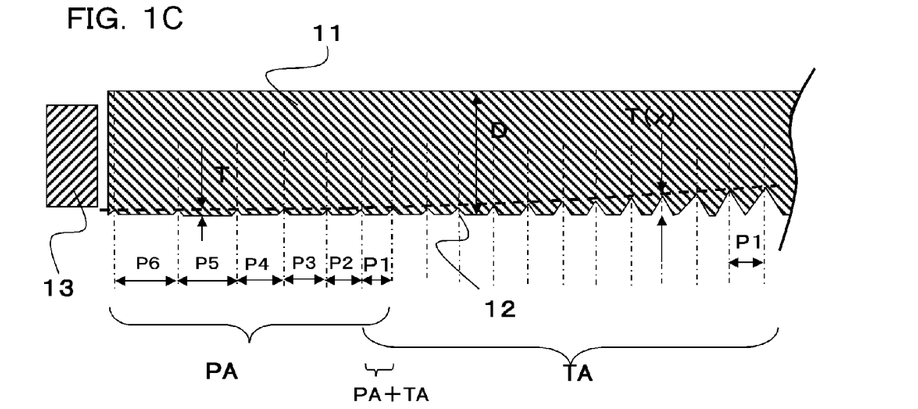
FIG. 1C is a partial cross-sectional view of an end portion of a light guide according to a modification example of Embodiment 1.

Although the first region PA and the second region TA are different regions in Embodiment 1, it is also preferable to provide a region (PA+TA) in which the depth of the prisms 12 varies while varying the pitch between the two regions as shown in FIG. 1C. FIG. 1C is a view corresponding to FIG. 1B, showing another example.

In this case, when the depth and the pitch of prisms smoothly vary in the relation of adjacent regions, luminance evenness can be also secured.

Although the LED light sources 13 are provided in both sides of the light guide 11 in this embodiment, the light sources may be provided in one side.

In the light guide according to the present invention, the second region TA in which the depth is variable and the first region PA in which the pitch is variable are provided, thereby reflecting incident light efficiently even in the thin light guide. As a result, the depth of the prisms 12 can be designed to be 10 μm or less, and a pattern design corresponding to 50 inches (1050 mm×650 mm) in a thickness of 0.3 mm level can be realized.

In related art, in the case of the design in which only the depth of grooves is variable in the light guide having the thickness of 0.3 mm, a design corresponding to 10 inches (210 mm×140 mm) was a limit. However, the large area pattern which is approximately 23 times as large as the related art pattern can be fabricated. The thin light guide with the large area can be realized.

The shape of the prisms 12 in the alignment direction of the LEDs 13 is fixed and constant. That is for allowing light of the LED 13 to be uniform with the alignment of the LED 13 in the vertical direction. The cross-sectional shape of the prisms 12 is a triangle, and respective prisms 12 are preferably similar shapes. Accordingly, light reflection will be uniform. Furthermore, the design can be simplified and manufacturing becomes easy.

Embodiment 2

A light guide 11 according to Embodiment 2 of the present invention will be explained with reference to FIG. 3 and FIG. 4.

Figure 3:
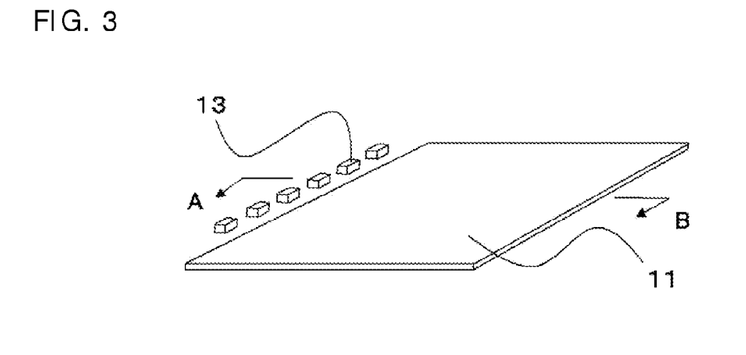
FIG. 3 is a perspective view showing a light guide according to Embodiment 2.

FIG. 3 is a view showing the light guide 11 according to Embodiment 2. LED light sources 13 and the light guide 11 are included. A plurality of LED light sources 13 are arranged only in one side of the light guide 11. Other structures not described below are the same as structures of Embodiment 1.

Figure 4:
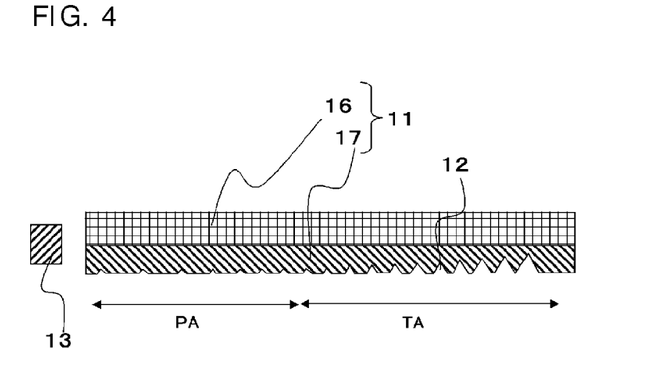
FIG. 4 is a partial cross-sectional view of the light guide according to Embodiment 2.

FIG. 4 is an enlarged view showing a cross section in a surface A-B of the light guide 11 of FIG. 3. Prisms 12, an acrylic sheet 16 and a UV resin layer 17 are included. The prisms 12 are the same as those of Embodiment 1 (FIG. 2A, FIG. 2B). However, the LED light sources 13 are provided only in one side, therefore, the prism pattern only in the left side of FIG. 2A and FIG. 2B is shown. That is, the pattern has one first region PA and one second region TA.

As shown in FIG. 4, the light guide 11 is formed so that the UV resin layer 17 closely contacts the acrylic sheet layer 16, in which prisms 12 having a triangular fine concave-convex groove shape are formed in the UV resin layer 17.

According to the structure, the prisms 12 having the V-shape fine concave-convex groove shape can be fabricated in a thin sheet by using a transfer process using UV resin. In a manufacturing process, a metal mold is formed, in which convex optical-surface triangle shapes for forming fine concave-convex groove shapes are formed as a concave-convex pattern which is reverse to the shape of the light guide to be transferred so as to be correspond to the pitch variable shape and the depth variable shape.

After releasing processing is performed to the metal mold, the UV resin is applied, and a transparent acrylic sheet is covered thereon while being touched from an edge so that bubbles do not enter. After the process, the UV resin is cured by irradiation of ultraviolet light from the transparent acrylic sheet side. After the curing, the acrylic sheet and the UV resin layer are peeled off from the surface of the metal mold in the integral state. According to the transfer process, the pattern layer of the prisms 12 of the UV resin layer 17 is formed in the acrylic sheet layer 16. When the UV resin layer is used in other embodiments, the same manufacturing method can be used.

Embodiment 3

Figure 5:
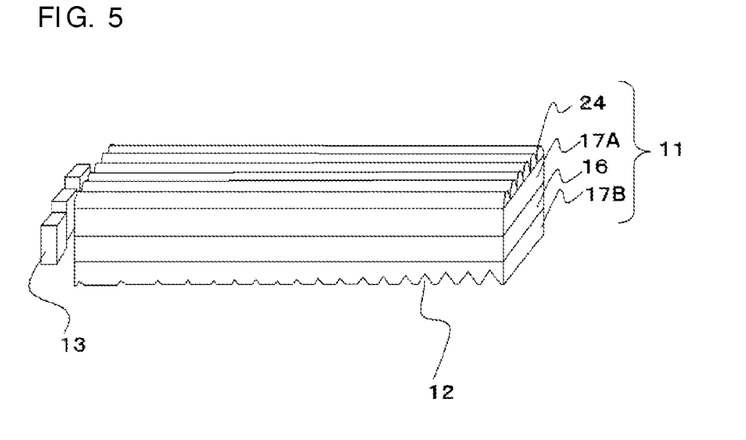
FIG. 5 is a perspective view of a light guide according to Embodiment 3.

FIG. 5 is a perspective view of a light guide 11 according to Embodiment 3 of the present invention. Prisms 12, a first UV resin layer 17A, a second UV resin layer 17B and an acrylic sheet layer 16 are included. The prisms 12 are formed in the second UV resin layer 17B. The shape of the prisms 12 is the same as that of Embodiment 2. Other structures not described below are the same as structures of Embodiment 1.

The acrylic sheet layer 16 secures a light guide thickness for guiding light to a horizontal direction (parallel to the sheet surface). As front and back surfaces of the acrylic sheet layer 16 are mirror surfaces, light is guided and spread while being totally reflected in the acrylic sheet resin layer.

In the first UV resin layer 17A, a fine mountain-shaped pattern 24 is formed in a direction orthogonal to the prism shape in the second UV resin layer 17B for taking a measure against unevenness when the light guide 11 emits light or for controlling light directivity.

In the fine mountain-shaped pattern 24, semicircular cylindrical mountain shapes each having 50 μm in radius are formed in a convex state at a pitch of 100 μm. The pattern is fabricated by using the transfer process using the UV resin in the same manner as Embodiment 2.

In the embodiment, a reflection prism for allowing luminance distribution in a plane of the light guide 11 to be uniform can be formed by forming the three-layer structure, and further, an optical pattern for taking a measure against luminance unevenness can be formed in the vicinity of the LED light sources 13 where light is concentrated can be formed on the thin sheet, which is a different surface from the surface where the prisms 12 are formed, thereby realizing a highly functional light guide.

Embodiment 4

A light guide 11 according to Embodiment 4 of the present invention will be explained with reference to FIG. 6 and FIG. 7.

Figure 6:
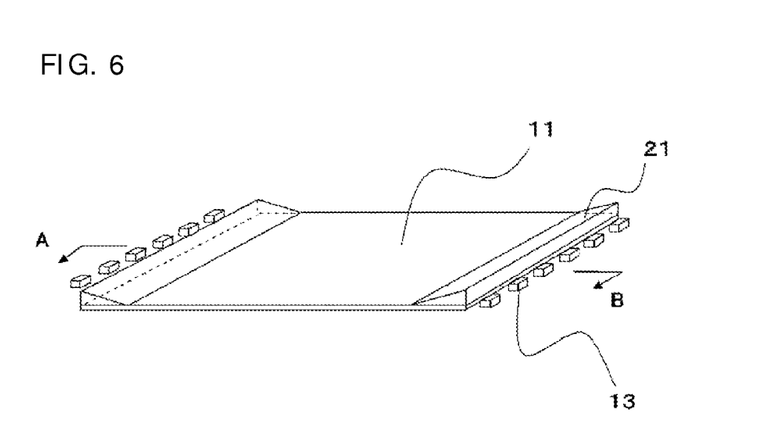
FIG. 6 is a partial cross-sectional view of the light guide according to Embodiment 3.

FIG. 6 is a view showing an illumination optical system using the light guide 11 according to Embodiment 4. The illumination optical system of FIG. 6 includes LED light sources 13 and the light guide 11. An inclined portion 21 is a portion where the thickness of the light guide 11 is increased in a direction getting close to the LED light sources 13 of the light guide 11.

Other structures are the same as those of Embodiment 1. In the illumination optical system, a plurality of LED light sources 13 are linearly aligned at almost constant intervals, which are arranged so as to face each other so that light from the LED light sources 13 is incident from two sides of the light guide 11.

Figure 7:
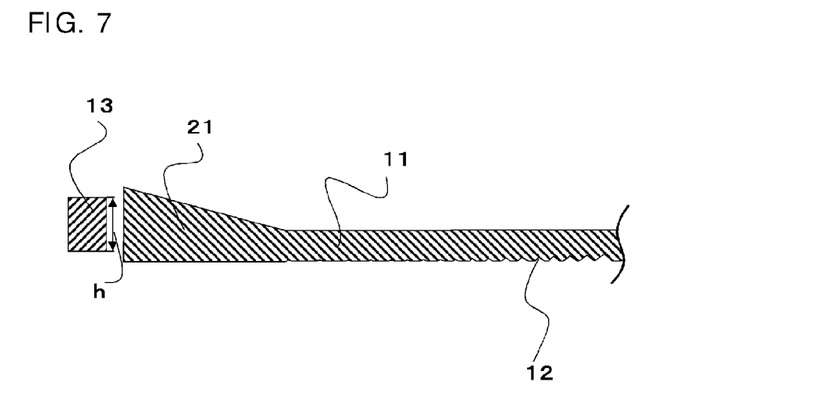
FIG. 7 is a perspective view showing a light guide according to Embodiment 4.

FIG. 7 is a partial cross-sectional view showing a vicinity of the LED light source 13 in a cross section of a line A-B of the light guide 11. The light guide 11 is formed by one layer of acrylic resin. In the light guide 11, fine concave-convex groove shaped prisms 12 each having an approximately V-shape are extended in the same direction as the linear alignment of the LED light sources 13. In FIG. 7, it is found that the V-shaped fine concave-convex shapes in cross section are aligned. The V-shaped fine concave-convex prisms 12 formed by one acrylic sheet layer are formed directly in the acrylic resin layer by the thermal transfer process and so on.

The light guide 11 has the inclined portion 21 as the portion where the thickness of the light guide 11 is increased in a direction getting close to the LED light sources 13. With respect to a height "h" of the LED light sources 13, the inclined portion 21 is formed so that a thickness of the light guide 11 is higher than the height "h" of the LED light sources 13. Accordingly, light can be incident on the thin light guide 11 from the LED light sources 13 efficiently.

In a region where the thickness of the light guide 11 becomes constant after the thickness of the inclined portion 21 becomes constant, fine triangular groove shaped prisms 12 are formed.

A length of the inclination of the inclined portion 21 (in the right and left direction, W-direction) is twice or three times of the height "h" of the LED light sources 13. When the length is shorter than twice or less the height, a ratio of light leakage is increased. If the length is longer than three-times or more the height, the commercial value of the light guide as the thin plate is reduced.

The inclined portion 21 has preferably a straight line (flat surface) not a curved line (spherical surface). It is preferable that light is reflected on the straight line (flat surface) so that incident light is guided into the light guide 11 uniformly.

When the height "h" of the light sources is 0.8 mm with respect to the thickness 0.3 mm of the light guide, light incident efficiency from the light sources is 40 to 50%. However, when the height of the inclined portion 21 is set to 0.8 mm, the light incident efficiency from the light sources is increased to 85 to 90%.

Embodiment 5

Figure 8:
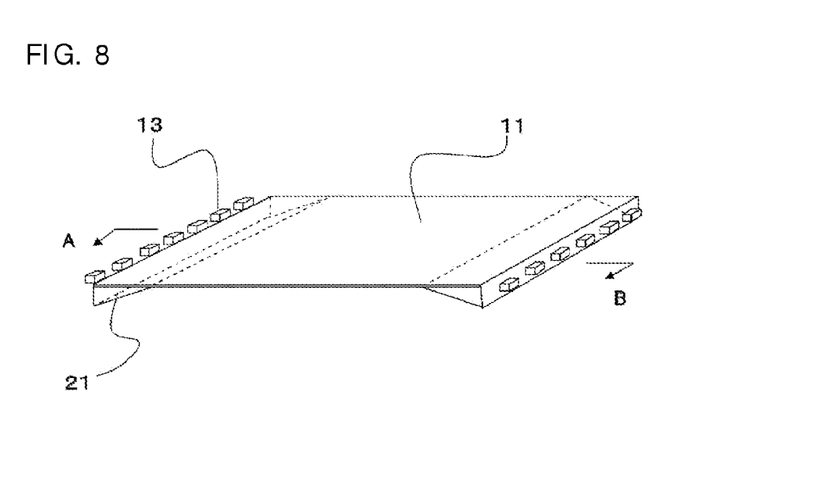
FIG. 8 is a partial cross-sectional view of the light guide according to Embodiment 4.

A modification example of the light guide 11 according to Embodiment 5 of the present invention will be explained with reference to FIG. 8 and FIG. 9. FIG. 8 is a perspective vies showing an illumination optical system using the light guide 11 according to Embodiment 5. Embodiment 5 differs from Embodiment 4 in a point that the inclined portion 21 is formed so as to increase the thickness of the light guide 11 as getting close to the light sources of the light guide 11 in a direction of the surface on which the prisms 12 are formed. Other conditions are the same as those of Embodiment 4. The shape of the inclined portion 21 is the same as that of Embodiment 4.

Figure 9:
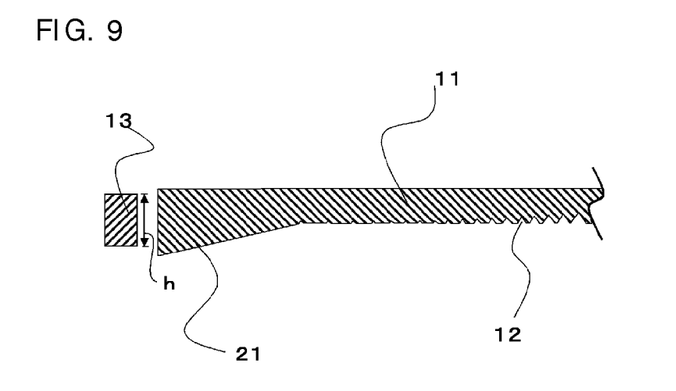
FIG. 9 is a perspective view showing a light guide according to Embodiment 5.

FIG. 9 is a partial cross-sectional view showing a vicinity of the LED light source 13 in a cross section along a line A-B of the light guide 11. The drawing corresponds to FIG. 7. The structure realizes the same effect as that of Embodiment 4. In addition to the effect of Embodiment 4, as the light guide 11 has the planarity when seen from the surface, a member such as a television can be easily installed on the surface.

Embodiment 6

Figure 10:
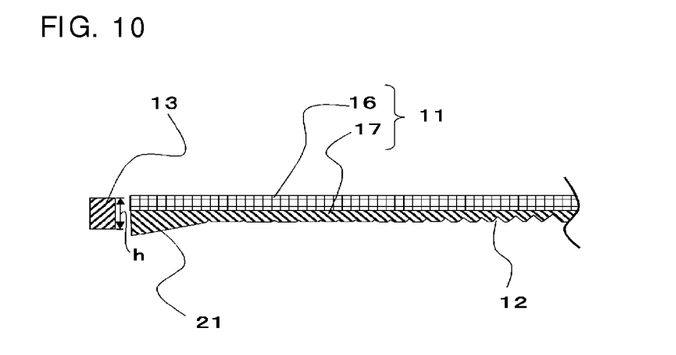
FIG. 10 is a partial cross-sectional view of the light guide according to Embodiment 5.

A light guide 11 according to Embodiment 6 of the present invention will be explained with reference to FIG. 10. FIG. 10 is a partial cross-sectional view showing a vicinity of the LED light source 13 in the illumination optical system using the light guide 11 according to an embodiment of the present invention. The illumination optical system of FIG. 10 includes the LED light sources 13 and the light guide 11. The light guide 11 includes the acrylic sheet layer 16 and the UV resin layer 17 in which prisms 12 as V-shaped grooves are formed. The inclined portion 21 is a portion where the thickness of the light guide 11 is changed to be increased in a direction getting close to the LED light sources 13 in the UV resin layer 17. The shape of the prisms 12 is the same as that of Embodiments 1 and 2.

The inclined portion 21 has a shape in which a thickness of an end portion thereof is gradually increased as coming close to the LED light source 13 so that the end portion is higher than the height "h" of the LED light sources 13. Accordingly, it is possible to allow light from the LED light sources 13 to be incident on the thin light guide 11 efficiently. As the inclined portion 21 is formed only in the same surface on which the prisms 12 as the V-shaped grooves are formed, it is possible to form the light guide so as to increase the height of a light incident portion by providing the UV resin layer 17 on the flat surface of the acrylic sheet layer 16, therefore, it is not necessary to fabricate one acrylic sheet having a particular shape. As a result, light incident efficiency from the light sources can be increased. The inclined portion 21 and the prisms 12 can be accurately formed by the formation using UV light. The shape of the inclined portion 21 is the same as that of Embodiment 4.

Embodiment 7

Figure 11:
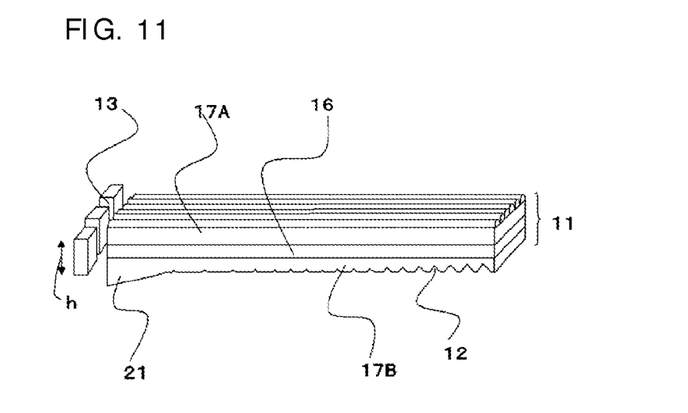
FIG. 11 is a perspective view of a light guide according to Embodiment 6.

A light guide 11 according to Embodiment 7 will be explained with reference to FIG. 11. FIG. 11 is a perspective view of an illumination optical system using the light guide 11 according to Embodiment 7. The embodiment is a modification example of Embodiment 3 (FIG. 5). The embodiment differs from Embodiment 3 in a point that the inclined portion 21 as a portion where the light guide thickness is increased in a direction getting close to the light sources is provided in the second UV resin layer 17B of the light guide 11.

A sum of heights of the acrylic sheet layer 16, the second UV resin layer 17B and the first UV resin layer 17A becomes higher than the height "h" of the LED light sources 13 due to the portion of the inclined portion 21. The inclined portion 21 in which the thickness of the light guide 11 is gradually increased as getting close to the light source side is formed only in the surface on which the prisms 12 are formed.

Accordingly, it is possible to allow light from the LED light sources 13 to be incident on the thin light guide 11 efficiently. Additionally, as the inclined portion 21 is formed in the same surface on which the prisms 12 are formed, it is possible to form the light guide so as to increase the height of the light incident portion by providing the UV resin layer on the flat surface of the acrylic sheet layer 16, therefore, light incident efficiency from the light sources can be increased without using an acrylic sheet layer 16 having a particular shape. Other conditions are the same as those of Embodiment 1.

A length of the inclined portion 21 in the length direction (right and left direction) of the light guide 11 is approximately twice or three times of the height "h". When the length is shorter than twice or less the height, the ratio of light leakage is increased. The shape of the inclined portion 21 is the same as that of Embodiment 4.

As described above, according to the present invention, it is possible to form the pattern uniformly emitting light on the thinner light guide 11 with the large area by forming fine prism shapes in the thin light guide 11, in which the depth of fine V-shaped grooves is limited to 5% or less of the light guide thickness with the area in which the pitch varies, the area in which the groove depth varies and a variable in which these areas are combined.

Furthermore, the fine V-shaped reflection grooves can be formed to be low in height as well as formed with variations of pitches and depths which are not recognized as unevenness by human eyes, therefore, the light guide can be used for a backlight for an ultra-thin liquid crystal TV.

In the pattern according to the present invention, the variation of the prisms 12 is small and shallow, therefore, the transfer in the thin layer can be performed in the manufacturing process using the UV resin and in the process using the thermal transfer, which enables the fabrication of a thinner light guide 11.

As the light guide is a thin sheet, it can be bent freely in an elastic range. Various illumination devices and backlights for videos can be formed with an ultra-thin thickness and light weight as well as new design by taking advantages of ultra-thin, light weight and bending characteristics of the light guide 11 according to the present invention.

Embodiments 1 to 8 can be suitably combined.

INDUSTRIAL APPLICABILITY

The present invention can be applied to various types of illumination devices, backlights for videos and so on.

REFERENCE SIGNS LIST

11 light guide
12 prism
13 LED light source
16 acrylic sheet layer
17 UV resin layer
17A first UV resin layer
17B second UV resin layer
21 inclined portion
22 reflecting prism surface
23 light emitting surface
24 fine mountain-shaped pattern
PA first region
TA second region

The invention claimed is:
1. A light guide comprising:
a side surface on which light is incident;
a bottom surface having plural grooves on which the light is reflected; and
an upper surface from which the light is emitted,
wherein the bottom surface includes:
a first region in which a pitch of the grooves varies in accordance with a distance from the side surface and in which a depth of the grooves is constant; and
a second region, different from the first region, in which a depth of the grooves varies in accordance with a distance from the side surface and in which the pitch of the grooves is constant.
2. The light guide according to claim 1,
wherein the first region is arranged from the side surface on which the light is incident, and the second region is arranged adjacent to the first region in an inward side of the light guide.
3. The light guide according to claim 1, comprising:
another side surface on which light is incident;
a third region in which the pitch of the grooves varies in accordance with a distance from the other side surface and in which a depth of the grooves is constant;
wherein the second region is arranged between the first region and the third region in the inward side of the light guide.
4. The light guide according to claim 1,
wherein the pitch of all grooves in the light guide is 800 μm or less.
5. The light guide according to claim 1,
wherein a ratio between a thickness D of the light guide and the maximum depth Tmax of the grooves is represented by the following expression;

$$Tmax/D \leq 0.05.$$

6. The light guide according to claim 1,
wherein a difference ΔT of depths of the grooves between the first region in which the pitch of the grooves varies and the second region in which the depth varies is represented by the following expression;

$$\Delta T < 0.6\ \mu m.$$

7. The light guide according to claim 1,
wherein the light guide is formed by including a UV resin layer positioned on the bottom surface and having the grooves, and
a sheet resin layer positioned on the upper surface.
8. The light guide according to claim 1,
wherein the light guide is formed by including a first UV resin layer positioned on the upper surface and having a prism shape,
a second UV resin layer positioned on the bottom surface and having the grooves, and
a resin layer positioned between the first UV resin layer and the second UV resin layer, which is not the UV resin layer.
9. The light guide according to claim 1,
wherein a thickness of the light guide is larger toward the side surface on which light is incident.
10. The light guide according to claim 9, comprising an inclined portion on the upper surface which makes the thickness of the light guide larger toward the side surface on which light is incident.

11. The light guide according to claim 9, comprising an inclined portion on the bottom surface which makes the thickness of the light guide larger toward the side surface on which light is incident.

12. The light guide according to claim 1,
   wherein a difference ΔT of depths of the grooves between the third region in which the pitch of the grooves varies and the second region in which the depth varies is represented by the following expression;

$\Delta T < 0.6 \, \mu m.$

\* \* \* \* \*